United States Patent [19]
Ohms et al.

[11] Patent Number: 6,061,884
[45] Date of Patent: May 16, 2000

[54] INTERLOCKING CABLE SUPPORT TRAY SYSTEM

[75] Inventors: Donald Ohms, Sparta; Terry McCrary, Pickneyville; Steve Hagene, Pickneyville; Brad Noward, Pinckneyville, all of Ill.

[73] Assignee: GS Metal Corp., Pinckneyville, Ill.

[21] Appl. No.: 09/232,172

[22] Filed: Jan. 15, 1999

[51] Int. Cl.[7] ............................. A44B 21/00; B42F 1/00
[52] U.S. Cl. .................. 24/703.1; 24/703.5; 24/545; 24/563
[58] Field of Search ................. 24/703.1, 703.2, 24/703.3, 703.4, 703.5, 703.6, 704.1, 456, 563, 545, 346, 20 S, 20 W

[56] References Cited

U.S. PATENT DOCUMENTS

| | | | |
|---|---|---|---|
| 2,180,500 | 11/1939 | Bernstein | 24/703.5 |
| 2,299,380 | 10/1942 | Chalmer et al. | 24/20 W |
| 2,358,490 | 9/1944 | Corral Uribe | 24/703.4 |
| 2,467,604 | 4/1949 | Tinnerman et al. | 24/563 |
| 3,231,075 | 1/1966 | Ivanhoe | 24/456 |
| 3,840,947 | 10/1974 | Burbidge | 24/703.1 |
| 4,542,684 | 9/1985 | Cantrell | 24/545 |
| 5,331,725 | 7/1994 | Chou | 24/545 |
| 5,384,937 | 1/1995 | Simon | 24/563 |

*Primary Examiner*—Victor N. Sakran
*Attorney, Agent, or Firm*—Piper Marbury Rudnick & Wolfe

[57] ABSTRACT

A tray section is constructed of longitudinal and transverse wire members. The tray sections may be configured or joined by interlocking clips, each of which features two pairs of opposing tabs separated by a pair of opposing notches. The opposing notches feature an arcuate portion and each is sized to receive a single longitudinal wire member. Each interlocking clip also features a back portion that is integral with the opposing tabs and notches. The back portion and opposing tabs are sized so that they surround a pair of adjacent transverse wire members when the opposing tabs are crimped. A crimping tool is used to install the interlocking clips and features pivotally connected opposing jaw portions with arcuate indentations. The arcuate indentations are sized to cooperatively surround the back and opposing tabs of the interlocking clip with the pair of adjacent transverse wire members received therein. Wire mesh floor pans that do not obstruct air flow may be used to support the tray sections.

9 Claims, 8 Drawing Sheets

FIG. 18 ically at 30 in FIG. 1. The system of FIG. 1 utilizes a number

INTERLOCKING CABLE SUPPORT TRAY SYSTEM

BACKGROUND OF THE INVENTION

The invention relates generally to cable management systems, and, more particularly, to a cable support tray system that utilizes interlocking clips to join tray sections and improved floor pans to support tray sections.

Computer, telecommunication and other electronic-based systems are utilized extensively in modern manufacturing plants, hospitals, schools, homes, telecommunication centers and other commercial and noncommercial environments. Such complex systems typically feature a large number of cables that must be routed throughout a structure. As a result, cable management systems that organize and protect cables have become popular. One type of cable management system utilizes trays to support cables.

Figure 1:
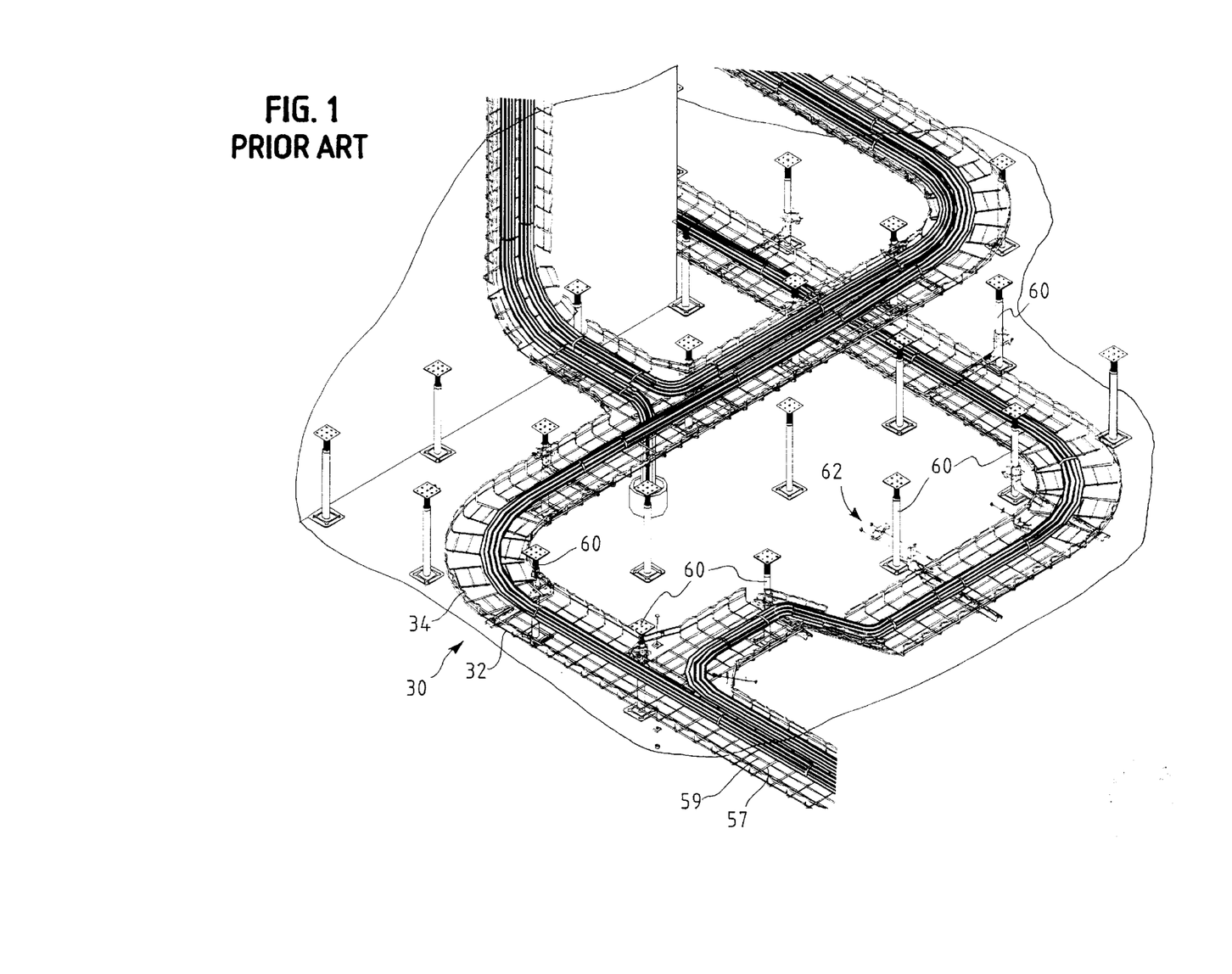
FIG. 1 is a partial perspective view of a prior art cable support tray system.

A prior art cable support tray system, the FLEXTRAY system offered by the present assignee, is illustrated generally at 30 in FIG. 1. The system of FIG. 1 utilizes a number of standard tray sections 32 of welded wire mesh construction that may be cut, bent and joined to form a variety of tray configurations. More specifically, as illustrated in FIG. 1, tray sections may be configured to form paths that turn, rise, drop and intersect. This allows the tray system to support and direct a number of cables 34 around, over or under obstacles.

Figure 2A:
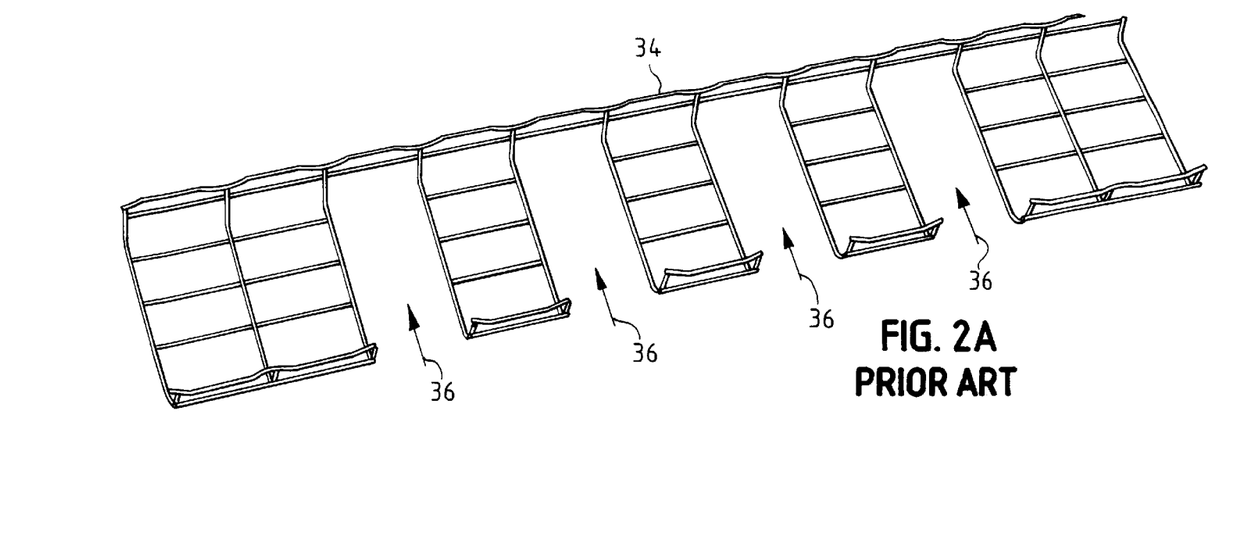
FIG. 2A is a perspective view of a tray section of the system of FIG. 1 with selected wire sections removed.
Figure 2B:
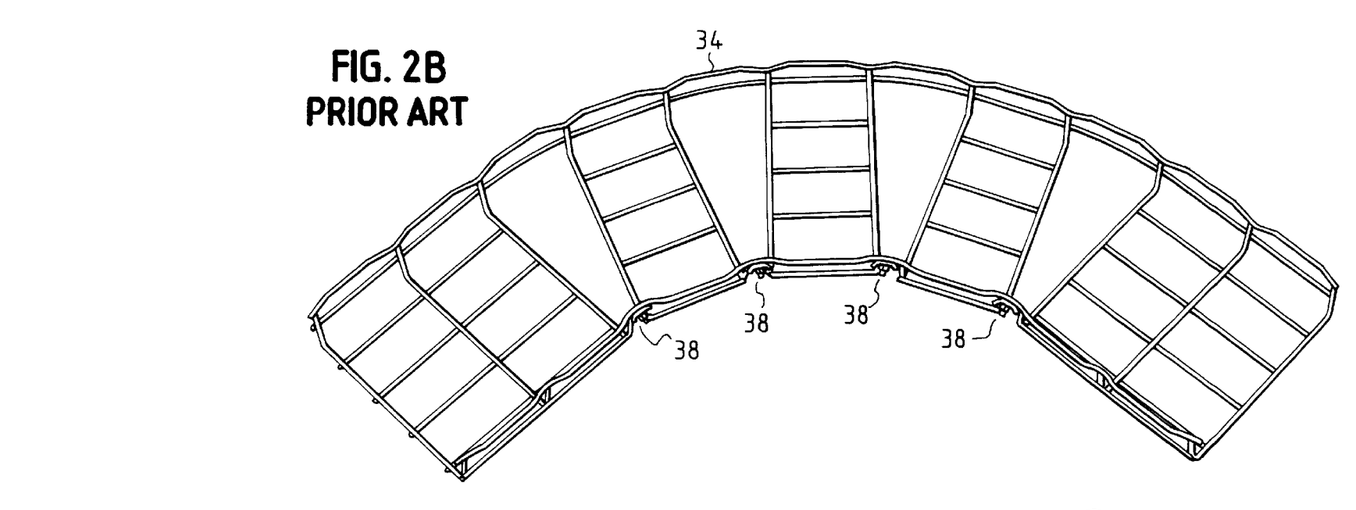
FIG. 2B is a perspective view of the tray section of FIG. 2A bent and secured to form a bending section.

FIGS. 2A and 2B illustrate how a tray section of the system of FIG. 1 may be configured to form a bending section with an arcuate cable path 34. Initially, as indicated by the arrows 36, wire sections are removed from the tray section. This may be done using a standard wire cutter. The tray section may then be bent as illustrated in FIG. 2B. The tray section is secured in the bent configuration by a number of clips, indicated at 38.

Figure 3:
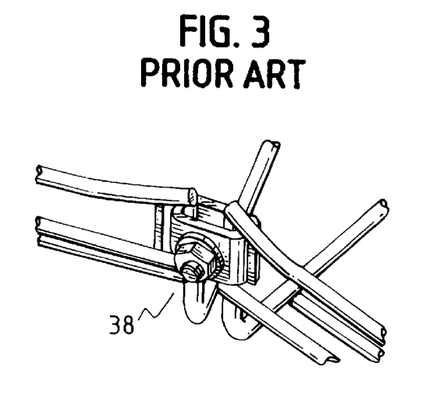
FIG. 3 is an enlarged perspective view of one of the clips of FIG. 2B.
Figure 4:
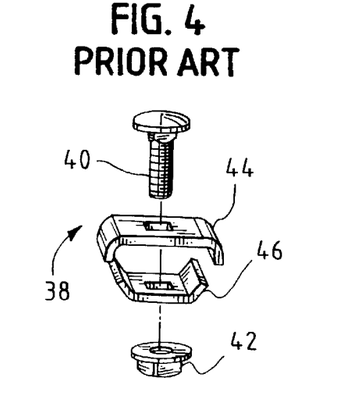
FIG. 4 is an exploded perspective view of the clip of FIG. 3.

An enlarged view of the clip, in its disassembled stated, is indicated generally at 38 in FIG. 4. The clip 38 consists of four parts: a bolt 40, a nut 42 and clamping members 44 and 46. As illustrated in FIG. 3, the clip 38 secures adjacent wire sections together by clamping them between members 44 and 46. The clamping members are then secured together via bolt 40 and nut 42. The tray sections thus may be modified and joined using standard wire cutters and wrenches.

Figure 5:
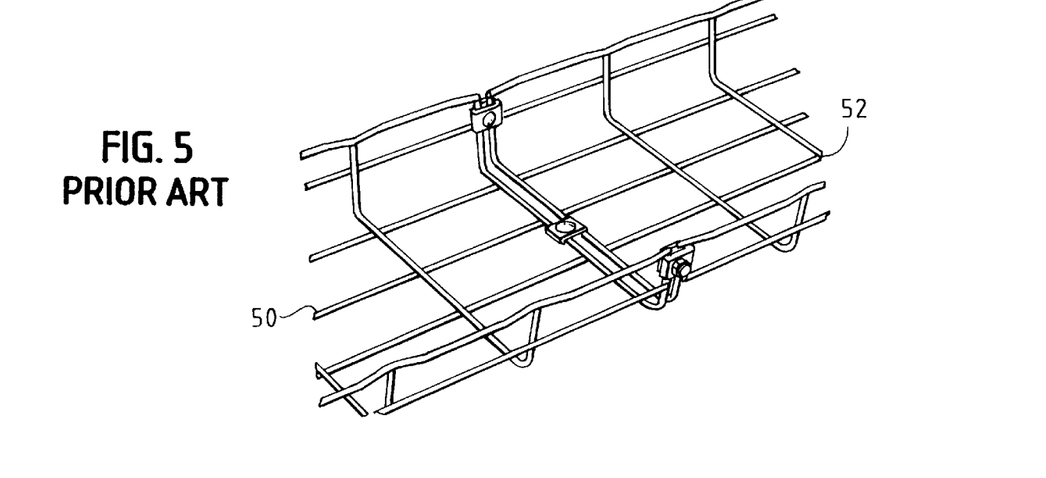
FIG. 5 is a partial perspective view of two prior art tray sections joined together.
Figure 6:
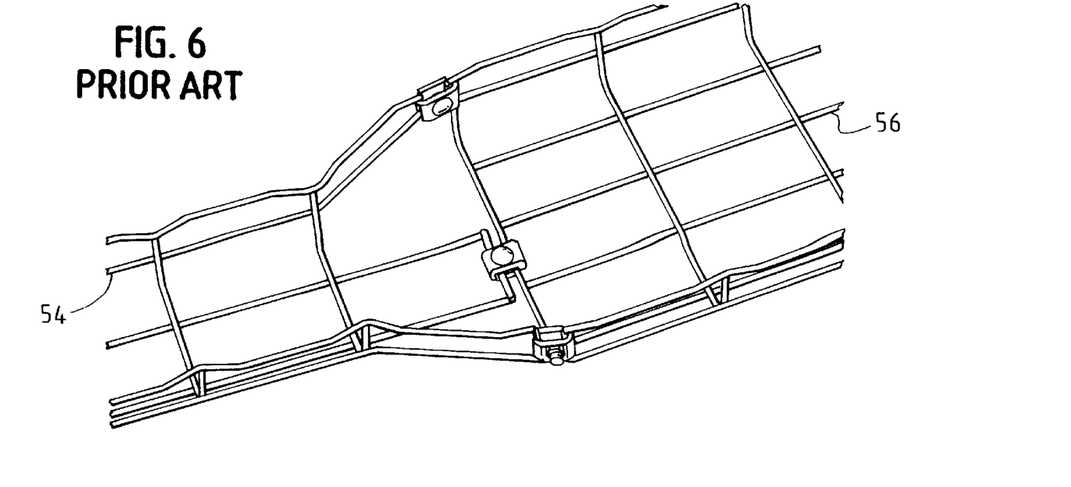
FIG. 6 is a partial perspective view of a prior art narrow tray section joined to a prior art wide tray section.
Figure 7:
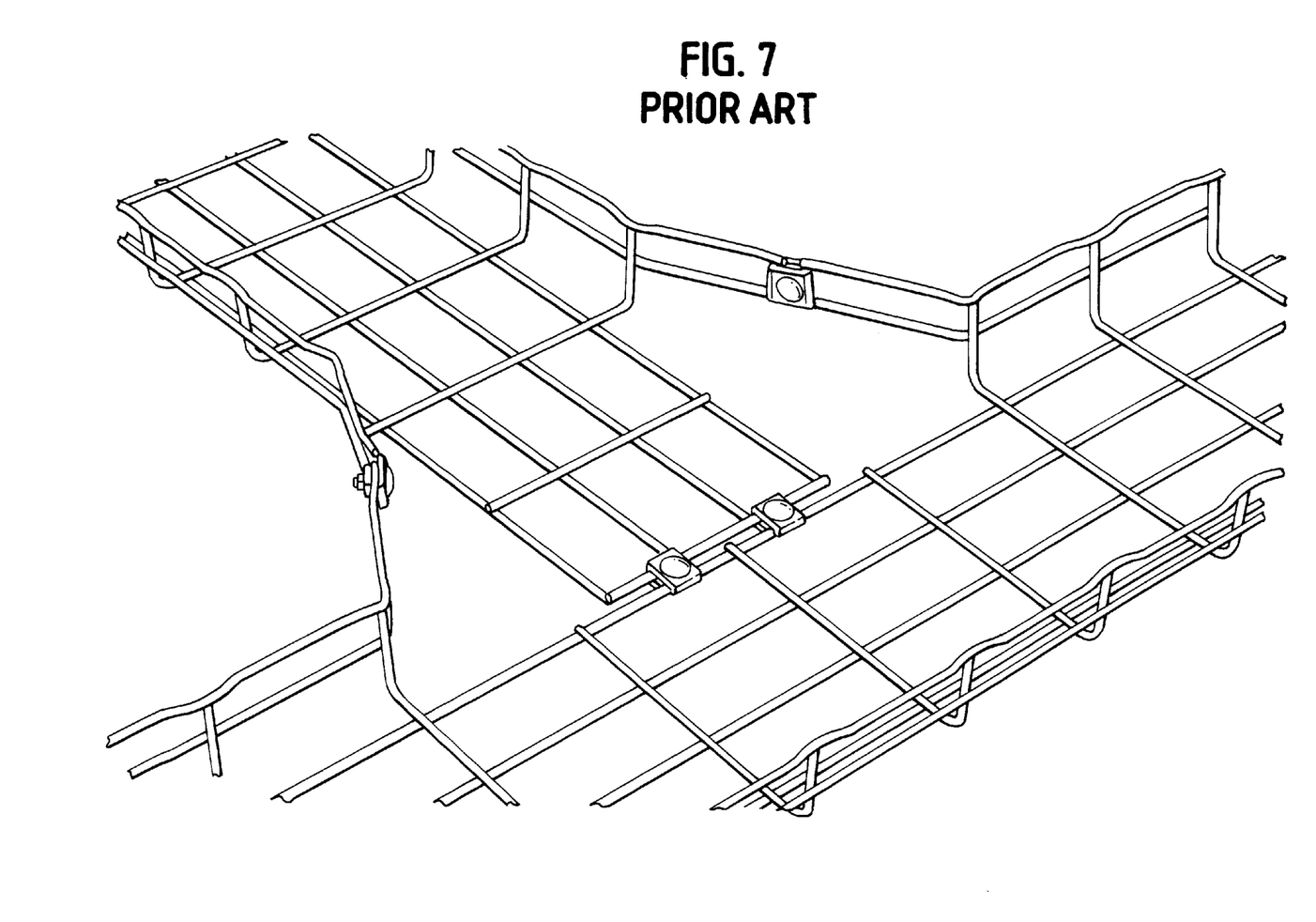
FIG. 7 is a partial perspective view of two prior art tray sections joined to form a T-junction.

As illustrated in FIG. 5, clips of the type illustrated in FIG. 4 may also be used to join adjacent tray sections 50 and 52. Furthermore, a narrow tray section may be cut and bent, as illustrated at 54 in FIG. 6, so that it may be joined to a wider tray section 56 via the clip of FIG. 4. As illustrated in FIG. 7, tray sections may also be cut, bent and joined using the clip of FIG. 4 so that a T-junction is formed.

The above examples illustrate the flexibility of the prior art tray system of FIGS. 1–7. A wide variety of wire pathways may be constructed from initially identical tray sections. As a result, only a limited variety of tray sections need to be kept in inventory and custom-made sections do not have to be ordered from the manufacturer. The wire design of the trays provides light weight, cable ventilation and ease of cable identification. Furthermore, the wires may be easily positioned upon the trays from the side (no need to pull the cables through a passage) and cable knots, kinks and twists are virtually eliminated.

A disadvantage of the system of FIGS. 1–7, however, is that the clip 38 features multiple parts. This increases the burden of inventorying and handling the clips. Furthermore, the clip must be assembled as it is installed. This increases installation time. The tightening of the nut and bolt also takes additional time and, over time, may potentially loosen. Furthermore, the clip 38 does not interlock with both the transverse and longitudinal wire members (indicated at 57 and 59 respectively in FIG. 1) of the tray sections. As a result, in a number of instances, the clips 38 do not prevent the shifting of the joined wire members.

The tray system of FIG. 1 may be supported in a variety ways. For example, it may be suspended from a ceiling by hangers or supported on a wall by brackets. The trays may also be supported upon a floor by supports such as those illustrated at 60 in FIG. 1. A disadvantage of the supports of FIG. 1, however, is that they consist of multiple parts that must be assembled, as indicated in general at 62.

Figure 8:
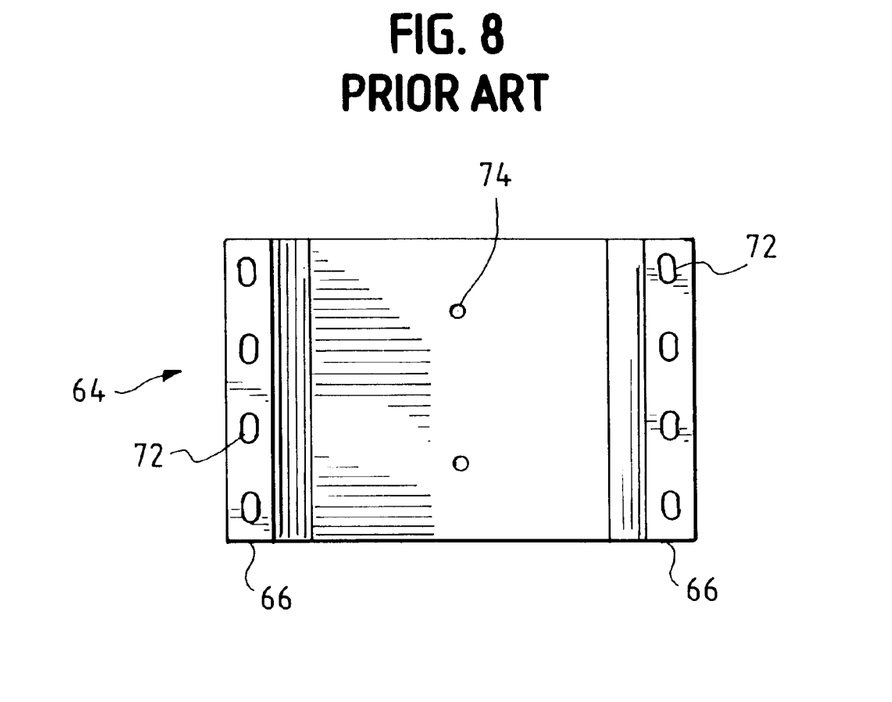
FIG. 8 is a top plan view of a prior art floor pan.
Figure 9:
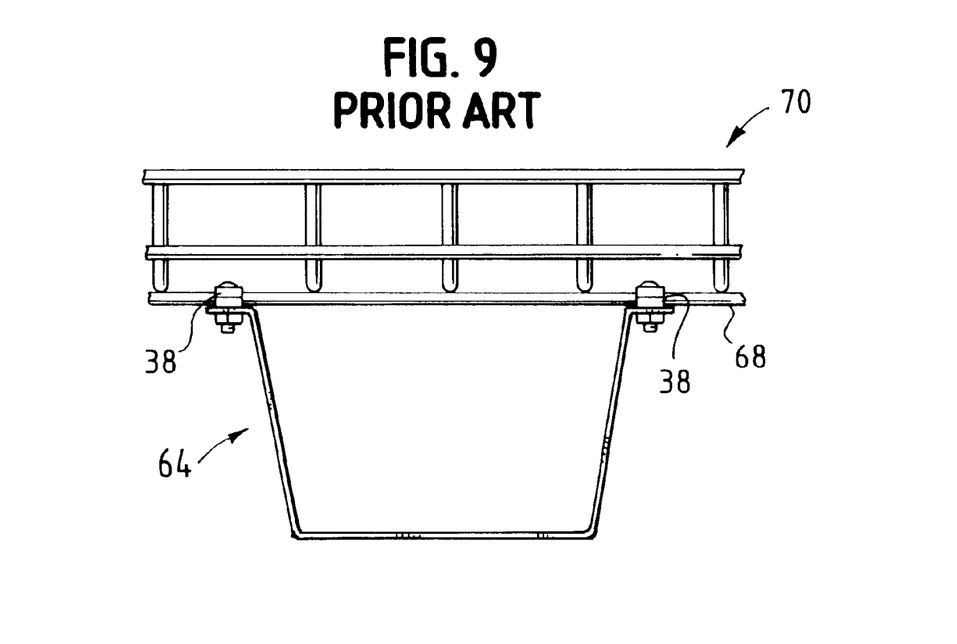
FIG. 9 is a side elevation view of the floor pan of FIG. 8.

Alternatively, the trays may be supported on a surface by floor pans of the type illustrated generally at 64 in FIGS. 8 and 9. Floor pan 64 is constructed of sheet metal and features horizontal flanges 66 that support the bottom wires 68 of a tray 70. The flanges feature holes 72 so that clips 38 (also shown in FIG. 4) may be used to secure the floor pan 64 and tray 70 together. The pan 64 also features base holes 74 so that it may be bolted to a floor. A disadvantage of the floor pan of FIGS. 8 and 9, however, is that it obstructs the flow of air through the space within which the tray 70 is housed.

Accordingly, it is an object of the present invention to provide a cable support tray system with sections that may be joined together or configured without the use of nuts and/or bolts.

It is another object of the present invention to provide a cable support tray system that utilizes one-piece clips to quickly and easily join or configure sections.

It is another object of the present invention to provide a cable support tray system that utilizes clips that interlock with both the longitudinal and transverse wire members of the tray sections.

It is still another object of the present invention to provide a cable support tray system that utilizes a one-piece support.

It is still another object of the present invention to provide a cable support tray system that may be supported upon a surface without obstructing the airflow over the surface.

SUMMARY OF THE INVENTION

The present invention is directed to an interlocking support tray system featuring tray sections constructed of longitudinal and transverse wire members. The longitudinal wire members are secured in a spaced and generally parallel relation by the transverse wire members. Wire members may be selectively removed from a tray section so that it may be bent to form various tray configurations. A number of tray sections may also be joined together.

The tray sections are configured or joined using interlocking clips. Each interlocking clip features a first pair and a second pair of opposing tabs separated by a pair of opposing notches. The notches preferably feature an arcuate portion and is sized to receive one of the longitudinal wire members of the tray sections. Each clip also features a back portion connected to each pair of opposing tabs. The back portion and opposing tabs are sized so that they cooperatively surround a pair of adjacent transverse wire members when the tabs are crimped. As a result, the clip interlocks with both the longitudinal and transverse wire members so there is no shifting. As a result, the intersection features structural rigidity.

A crimping tool featuring pivotally connected opposing handle and jaw portions may be used to install the interlocking clip. Each opposing jaw portion of the crimping tool features an arcuate indentation and a groove. Each groove is sized to receive a longitudinal wire member. The arcuate indentations are sized to cooperatively surround the back portion and opposing tabs of the interlocking clip with the adjacent pair of transverse wire members received therein when the jaw portions are closed.

A tray section may be supported upon a surface by a wire mesh floor pan. The wire mesh floor pan features a generally horizontal base that rests upon the surface and a pair of generally horizontal flanges that support the tray section. The tray section may be clipped to the flanges via the interlocking clips described above. A pair of leg portions extend between the pair of flanges and the base in a V-shaped configuration. The wire mesh floor pan does not obstruct air flow due to its open construction.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

Figures 10, 11, 12, 13:
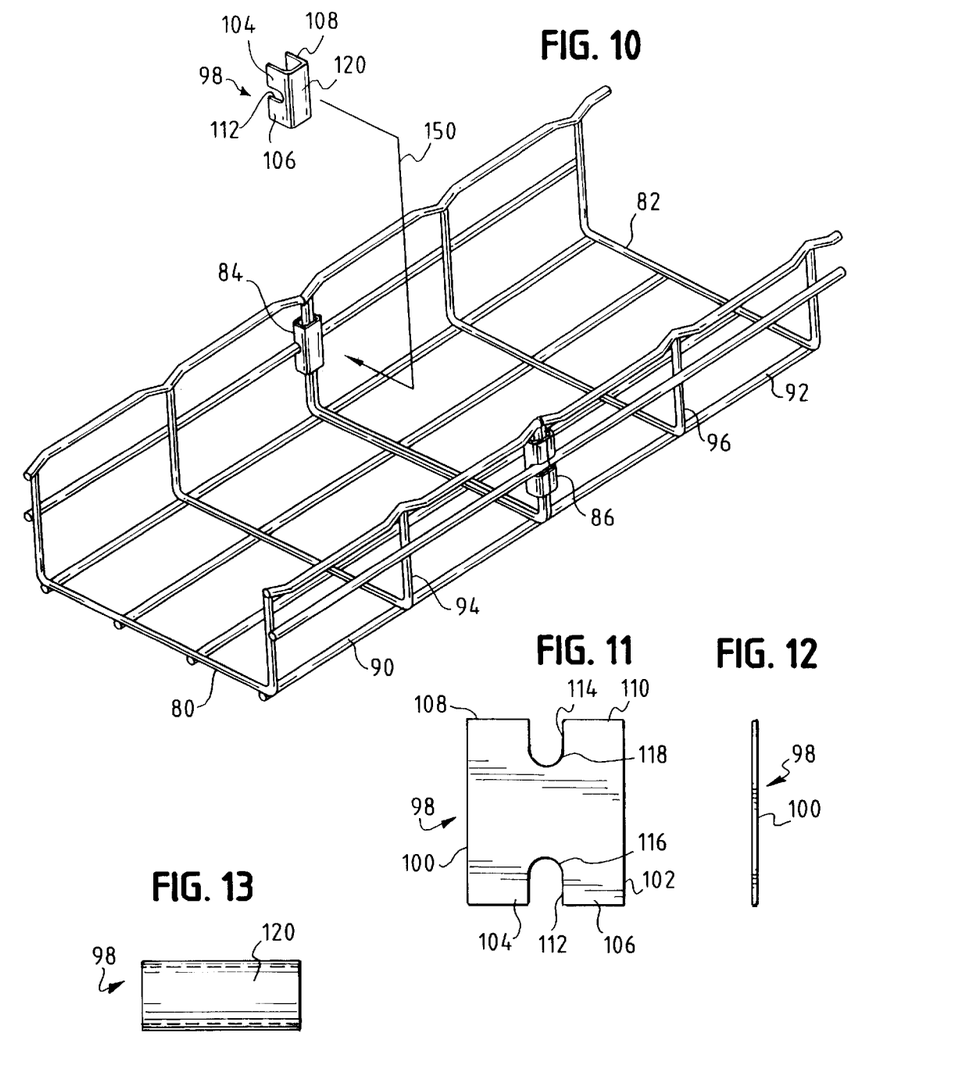
FIG. 10 is a perspective view of two tray sections joined by interlocking clips in accordance with the interlocking cable support tray system of the present invention.
FIG. 11 is an enlarged top plan view of a sheet of material cut so that it may be formed into one of the interlocking clips of FIG. 10.
FIG. 12 is a front elevation view of the sheet of FIG. 11.
FIG. 13 is a top plan view of the sheet of FIG. 11 formed into one of the interlocking clips of FIG. 10.

With reference to FIG. 10, two tray sections, 80 and 82, are joined by interlocking clips 84 and 86 in accordance with the present invention. Each tray section is formed of longitudinal wire members 90, 92 secured in spaced and parallel relation by transverse wire members 94, 96. The longitudinal and transverse wire members may be joined by welding or alternative methods known in the art. The longitudinal and transverse wire members may be constructed of a variety of materials including, but not limited to, metal and stainless steel. The size of the wire members may vary with the requirements of the application. A wire diameter of approximately ⅛" is typical. The wire members may also be finished or coated as required by the application. The joined tray sections support cables in the manner illustrated in FIG. 1.

Interlocking clip 98, indicated generally in FIG. 10, illustrates the configuration of interlocking clips 84 and 86 prior to installation. As shown in FIGS. 11 and 12, interlocking clip 98 is initially cut from a sheet of bendable material such as metal or steel. The thickness of the material used to construct the clips may vary depending upon the application. A thickness of approximately 0.04" is typical. The interlocking clip 98 features an opposing pair of straight sides 100 and 102. The remaining opposing sides feature two pairs of opposing tabs 104, 108 and 106, 110 separated by opposing notches 112, 114. Notches 112 and 114 are sized to receive one of the longitudinal wire members of a tray section. More specifically, each notch features an arcuate portion 116, 118 with a radius slightly larger than that of the longitudinal wire members.

Figure 14:
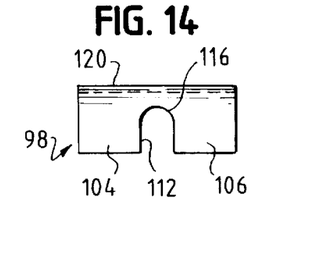
FIG. 14 is a side elevation view of the interlocking clip of FIG. 13.
Figure 15:
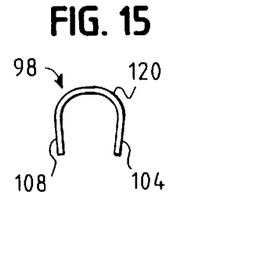
FIG. 15 is front elevation view of the interlocking clip of FIG. 13.

As shown in FIGS. 13–15, interlocking clip 98 is folded until the tabs on opposing sides are generally parallel to one another. As a result, back portion 120 is formed. Back portion 120 and tabs 104, 108 and 106, 110 are sized to cooperatively surround two adjacent transverse wire members.

The shape and sizing of the tabs, notches and back allow the interlocking clip 98 to secure adjacent tray sections together, as illustrated in FIG. 10. Once the tray sections are joined, the interlocking clips provide the intersection with structural rigidity. More specifically, the design of the interlocking clips are such that the joined tray sections are interlocked by both their longitudinal and transverse wire members (90, 92 and 94, 96, respectively) so that the tray sections 80 and 82 are prevented from shifting in both the horizontal and vertical directions. Furthermore, the interlocking clips 84, 86 and 98 may be used to interlock tray sections in arcuate cable paths such as 34 of FIG. 2B and the configurations illustrated in FIGS. 6 and 7.

Figure 16:
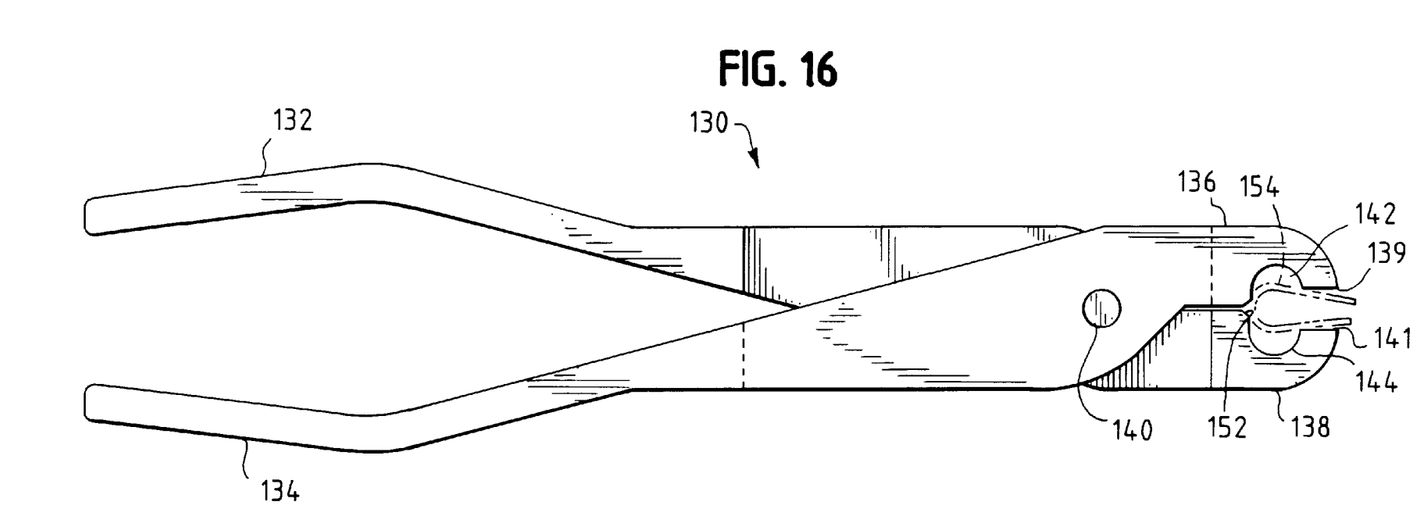
FIG. 16 is a side elevation view of the crimping tool that may be used to install the interlocking clip of FIGS. 13–15.
Figure 17:
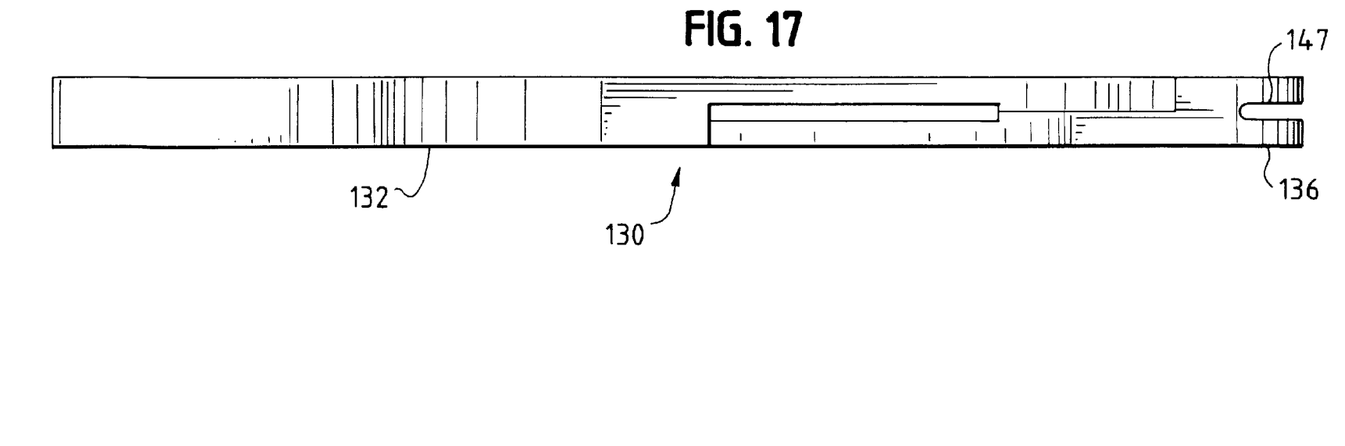
FIG. 17 is a top plan view of the crimping tool of FIG. 16.

While a variety of tools may be used to install the interlocking clip of FIGS. 10–15, including, for example, needle nose and conventional pliers, the task preferably is performed using the specially designed crimping tool illustrated generally at 130 in FIGS. 16 and 17. The crimping tool 130 features a pair of opposing handle portions 132 and 134 and a pair of opposing jaw portions 136 and 138 joined by a pivot point 140. Pivot point 140 may be formed in a variety of ways including, for example, by a rivet or a nut and bolt. The location of the pivot point may vary from the location illustrated. Crimping tool 130 may be constructed of a variety of materials known in the tool-making art, including steel. When the handle portions 132 and 134 of crimping tool 130 are drawn away from one another, the jaw portions 136 and 138 are opened, as illustrated in FIG. 16. Conversely, when the handle portions 132 and 134 are pressed together, the jaw portions 136 and 138 are closed so that their nose portions 139 and 141 meet.

Each jaw portion 136, 138 features an arcuate crimping indentation 142, 144. The crimping indentations 142 and 144 are sized to cooperatively surround the back and a pair of opposing tabs of an interlocking clip so that they are wrapped about adjacent transverse wire members (as illustrated in FIG. 10) when the jaw portions 136 and 138 are closed. The jaw portions 136 and 138 are sized so that they fit between neighboring tray wire members (both longitudinal and transverse) in both the open and closed conditions. The jaw portions also feature grooves 147 so that longitudinal wire members may be accommodated during crimping as described below.

An interlocking clip is installed by first positioning it within the partially opened crimping tool so that its back rests against stop 152 and a pair of its opposing tabs is held between nose portions 139 and 141, as illustrated in phantom at 154 in FIG. 16. The interlocking clip is then placed, via the crimping tool, over a pair of adjacent transverse wire members and abutting longitudinal wire members (as illustrated by arrow 150 in FIG. 10). More specifically, in reference to the interlocking clip 98, a longitudinal wire member is received within each of the notches 112 and 114 and the adjacent transverse wire members are received between opposing tabs 104, 106 and 108, 110 so that they are adjacent to back 120. The longitudinal wire members are also received in the grooves 147 of the crimping tool jaw portions. The jaw portions 136 and 138 of the crimping tool are then closed so that both pairs of opposing tabs are folded or crimped about the adjacent transverse wire members.

In a number of situations it is desirable to install the cable support tray system of the present invention under a raised floor. Such underfloor cabling applications could include, for example, computer rooms and the like. In such applications, it is desirable to maintain the airflow through the space under the flooring so that the cabling does not become overheated.

Figure 18:
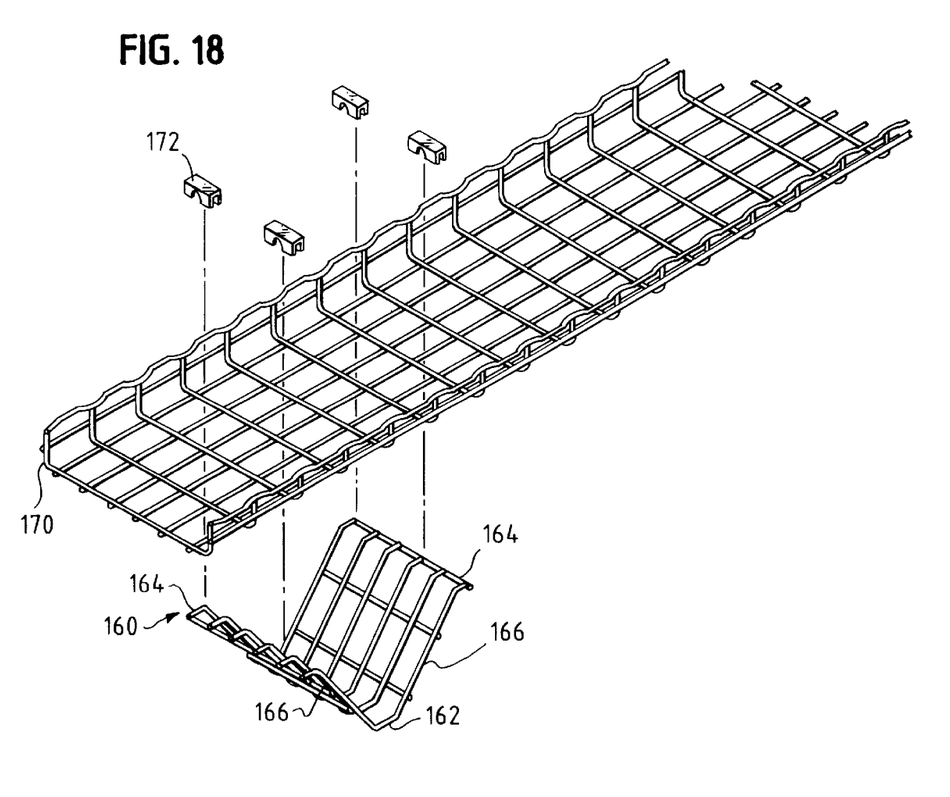
FIG. 18 is an exploded perspective view of a wire floor pan and a tray section of the interlocking cable support tray system of the present invention.

A wire mesh floor pan, illustrated generally at 160 in FIG. 18, features a welded wire mesh construction and allows a tray section 170 to be installed under a raised floor or in any other environment where unobstructed air flow is desired. The wire floor pan 160 may be constructed of the same type of wire used to construct the tray section and features a generally horizontal base 162 and flanges 164 that are joined by leg portions 166 in a V-shaped configuration. The wire floor pan is held to longitudinal and transverse wire members of tray section 170 via clips 172 or an alternative standard fastening method. Clips 172 may be of the interlocking type described above in reference to FIGS. 10–17. The base 162 of the wire floor pan rests upon the surface over which the tray section 170 is elevated. The base 162 may optionally be bolted to the surface using bolts and brackets (not shown). Due to its wire construction, the wire floor pan 160 elevates the cable support tray 170 without obstructing air flow through the space under the raised floor.

While the preferred embodiments of the invention have been shown and described, it will be apparent to those skilled in the art that changes and modifications may be made therein without departing from the spirit of the invention, the scope of which is defined by the appended claims.

What is claimed is:

1. An interlocking cable support tray system comprising:
   a) at least one tray section including a plurality of transverse wire members and a plurality of longitudinal wire members, said longitudinal wire members held in a spaced and generally parallel relation by said transverse wire members;
   b) an interlocking clip for joining tray sections to each other or to alter a single tray section to create arcuate cable paths, said clip including:
      i) a first pair of opposing tabs integrally formed on a back portion;
      ii) a second pair of opposing tabs integrally formed on the back portion and spaced from said first pair of opposing tabs by a pair of opposing arcuate notches also integrally formed on said back portion, each of said opposing arcuate notches sized to receive one of said longitudinal wire members; and
   c) a tool for crimping the first and second pairs of opposing tabs so that they cooperate with said back portion to surround an adjacent pair of transverse wire members while a longitudinal wire member is secured in the arcuate notches of said interlocking clip;
   whereby the adjacent pair of transverse wire members are interlocked with a longitudinal wire member so that shifting in both horizontal and vertical directions is prevented.

2. The interlocking cable support tray system of claim 1 wherein each of the opposing notches of the interlocking clip includes an arcuate portion sized to receive one of said longitudinal wire members.

3. The interlocking cable support tray system of claim 1 wherein the tool for crimping includes:
   a) a pair of opposing handle portions;
   b) a pair of opposing jaw portions;
   c) said pair of opposing handle and jaw portions joined by a pivot point so that said opposing jaw portions are opened and closed when said handle portions are opened and closed, respectively; and
   d) each of said opposing jaw portions including an arcuate indentation, said arcuate indentations sized to cooperatively surround the back portion and opposing tabs of said interlocking clip with the adjacent pair of transverse wire members received therein when the jaw portions are closed.

4. The interlocking cable tray support system of claim 3 wherein each of the opposing jaw portions of the tool for crimping includes a groove sized to receive a longitudinal wire member.

5. The Interlocking cable tray support system of claim 1 further comprising a wire mesh floor pan for supporting at least one tray sections on a surface, said wire mesh floor pan including:
   i) a generally horizontal base adapted to rest upon the surface;
   ii) a pair of generally horizontal flanges supporting the tray section; and
   iii) a pair of leg portions, one of each of said pair of leg portions extending between one of each of said pair of flanges and said base in a V-shaped configuration.

6. The interlocking cable support tray system of claim 5 wherein the tray section is secured to the pair of flanges of the wire floor pan by additional interlocking clips.

7. An interlocking clip for joining tray sections together or for altering a single tray section to create an arcuate cable path where the tray sections include a plurality of transverse wire members and a plurality of longitudinal wire members with the longitudinal wire members held in a spaced and generally parallel relation by the transverse wire members, the interlocking clip comprising;
   a) a first pair of opposing tabs integrally formed on a back portion;

b) a second pair of opposing tabs integrally formed on the back portion and spaced from said first pair of opposing tabs by a pair of opposing arcuate notches also integrally formed on said back portion;

c) said back portion and said first and second pair of opposing tabs cooperatively surrounding an adjacent pair of transverse wire members and said opposing arcuate notches receiving a longitudinal wire member;

whereby the adjacent pair of transverse wire members are interlocked with a longitudinal wire member so that shifting in both horizontal and vertical directions is prevented.

8. The interlocking clip claim 7 wherein each of the opposing notches includes an arcuate portion receiving one of said longitudinal wire members.

9. A method for interlocking a pair of tray sections, where each of the tray sections features a plurality of longitudinal wire members held in a spaced and generally parallel relation by a plurality of transverse wire members, comprising the steps of:

a) providing an interlocking clip with two pairs of opposing tabs separated by a pair of opposing arcuate notches and a back portion connected to the two pair of opposing tabs;

b) aligning the pair of tray sections so that two transverse wire members, one from each of the pair of tray sections, are adjacent;

c) positioning said interlocking clip so that a longitudinal wire member of each tray is received in one of each of the arcuate notches of said interlocking clip; and d) crimping the two pairs of opposing tabs so that the adjacent transverse wire members are cooperatively surrounded by the back portion and the two pairs of opposing tabs of the interlocking clip so that shifting in both horizontal and vertical directions is prevented.

\* \* \* \* \*